(12) United States Patent
Merz

(10) Patent No.: US 6,470,281 B1
(45) Date of Patent: Oct. 22, 2002

(54) METHOD AND APPARATUS FOR MEASURING A THROTTLE POINT

(75) Inventor: Harald Merz, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,636

(22) PCT Filed: Feb. 10, 1999

(86) PCT No.: PCT/DE99/00350

§ 371 (c)(1),
(2), (4) Date: Jan. 24, 2000

(87) PCT Pub. No.: WO99/61876

PCT Pub. Date: Dec. 2, 1999

(30) Foreign Application Priority Data

May 23, 1998 (DE) .......................................... 198 23 125

(51) Int. Cl.[7] .............................. G01B 5/00; G01F 25/00
(52) U.S. Cl. .............................. 702/38; 702/50; 702/51; 73/1.25; 73/1.26; 376/215; 376/217

(58) Field of Search .............................. 702/33, 34, 35, 702/38, 44, 50, 51; 73/1.05, 1.25, 1.26, 1.57, 1.73, 152.18; 192/3.29, 3.3, 3.33; 376/210, 215, 217

(56) References Cited

U.S. PATENT DOCUMENTS 3,630,839 A * 12/1971 Podolsky ..................... 376/217
4,582,185 A * 4/1986 Grimes et al. ............... 192/3.3
4,629,115 A * 12/1986 Lampert et al. .............. 236/36
5,092,158 A * 3/1992 Tuma et al. .................. 73/1.05

* cited by examiner

*Primary Examiner*—Bryan Bui
(74) *Attorney, Agent, or Firm*—Michael J. Striker

(57) ABSTRACT

In a process and a device for measuring a throttle point, a fluid under pressure is applied to the throttle point by a pump, at least one operating parameter of the pump is acquired and stored, at least two reference operating parameters of two reference throttles are acquired and stored, and the operating parameters are compared with a reference operating parameters in an evaluating unit and a throttle magnitude is outputted.

17 Claims, 2 Drawing Sheets

METHOD AND APPARATUS FOR MEASURING A THROTTLE POINT

PRIOR ART

The invention is directed to a process and a device for measuring a throttle point according to the generic part of the independent claims.

Conventionally, mechanical or optical measuring methods are used when measuring throttle points, especially bore holes, nozzles or diaphragms, but these methods are difficult to use when the throttle points to be measured are very small. This necessitates the development of new procedural methods such as those known, e.g., from DE-OS 196 36 431. This reference is concerned with a process and a device for testing the operability of a tank ventilation installation, the process being based on the following principle: pressure is applied to the tank ventilation installation by means of a pressure source, with the pressure resulting in the tank or vessel being proportional to one of the operating characteristic quantities or parameters of the pump. If the vessel or the tank ventilation installation has a leak, a correspondingly different pressure results, .which in turn affects one of the operating parameters of the pressure source, e.g., current, voltage and/or rotational speed. By detecting or acquiring these operating parameters, conclusions can be drawn as to whether a leak is present in the vessel. By comparison with a suitable reference leak, a decision can be made as to whether the detected leak is bigger or smaller than the reference leak. A qualitative measurement of this leak is carried out; however, a quantitative determination of the magnitude of the leak is not possible.

ADVANTAGES OF THE INVENTION

The process according to the invention with the features of the main claim has the advantage of being not only a qualitative but also a quantitative method for measuring a throttle point, especially a bore hole, nozzle, diaphragm or a leak. Through acquisition and storage of at least one operating parameter of the pump and through additional acquisition and storage of at least two reference operating parameters of two reference throttles, it is possible to make a quantitative statement about the magnitude of a throttle by comparing the operating parameter with reference operating parameters which can be saved in an evaluating unit.

Advantageous further developments of the process according to the main claim are made possible by the measures indicated in the subclaims.

It is accordingly advantageous when at least one reference operating parameter of one reference throttle is determined before the throttle point to be measured, since before the actual measurement or measurements take place a calibration, that is, a correlation of operating parameter to throttle magnitude, can be carried out or a check can be carried out as to whether the system has changed with respect to an earlier calibration, or whether this earlier calibration can still be used.

If at least two reference operating parameters are determined before the throttle point to be measured, it is possible to output the magnitude of the actual throttle point directly after measuring it and thus to make a direct determination.

If the process is used within the framework of automated production processes, where the emphasis is on the highest possible piece number of throttles identical to each other, it is exceedingly advantageous when the reference operating parameters are acquired only once and then used for the comparison of a plurality of throttle points to be measured. In this manner, their magnitude can be determined very quickly in a correspondingly time-saving manner, since the reference data are already known and alternating measurement of the reference throttle and actual throttle is therefore dispensed with.

The actual physical principle of this process is based on a comparison of the pressure prevailing at a reference throttle and the pressure prevailing at a throttle point to be measured. Since measuring the pressure necessitates additional technological steps, acquiring the operating parameters of the pump instead is known to be of great advantage; this is because there is generally a proportional relationship between them and the resulting pressure. Appropriate operating parameters of a pump are the current flowing through the pump, the voltage applied to the pump or the rotational speed of the pump. Naturally, in order to obtain measurements that are correct and can be reproduced, the operating parameters are advisably only measured when a constant backpressure has built up at the reference throttle or the throttle to be measured.

It can also be advantageous when the process is configured in such a way that the reference throttles can be measured in a separate arm or branch of the measuring arrangement. In this manner, reference throttles and throttle points to be measured can be exchanged independently of each other. This can be. especially advantageous if the magnitude of a throttle point to be measured can not easily be estimated in advance and there is accordingly no hint of which size reference throttle should ideally be used. If, on the other hand, a reasonable estimate of the geometry of the throttle points to be measured is possible and there is accordingly no foreseeable need for complicated reference measurements, it can be advantageous to measure the reference throttles in the same place as the throttle points to be measured. In this case, a switching mechanism between the corresponding branches of a measuring arrangement is no longer necessary.

Differing geometries of reference throttles and throttle points to be measured can lead to inaccuracies in the measurement results. For this reason, it is advantageous when evaluating to correct the operating parameters or the reference operating parameters, or both, with a correction factor and/or an addition term. In this manner, this process, which is to be realized by a machine that uses a determined set of reference throttles, can be used for a wide variety of geometries of different throttle points to be measured.

Determining the throttle magnitude can either be done via an averaging process or a logical comparison or by matching a characteristic curve to the reference operating parameters. The latter is advantageous because it increases the accuracy of the process. An additional increase of the accuracy of this process can be achieved by measuring as many reference throttles as possible.

Another advantageous variant of this process consists in that the evaluation of the measurement results is effected using a reference characteristic curve stored in the processing unit. This allows the measuring of a large number of throttle points without having to go back explicitly to the reference throttles. Therefore, it is also advantageous to store a plurality of reference characteristic curves in the evaluating unit, which makes it possible to switch between different geometries of throttle points to be measured without problems and without previous calibration. This is a particularly user-friendly variant of the process which permits the omission of complicated and possibly lengthy calibrating measurements.

There is a variety of possible embodiment forms of a corresponding device for realizing the claimed process. A device that calculates and outputs the throttle magnitude as quickly as possible and in an automated fashion is especially desirable and therefore especially advantageous. Accordingly, it is conceivable that, in addition to the obligatory second reference throttle for the quantitative determination of the throttle point to be measured, there is an evaluating unit containing at least a storage for receiving the operating parameters and storage for receiving the reference operating parameters. The throttle point magnitude can then be calculated on the basis of these stored values using a logical unit. This logical unit must accordingly be connected to the storage units as well as to an output device for outputting the calculated result.

Further, it is advantageous when there is a storage for storing reference characteristic curves.

The use of a vane-cell pump is especially advantageous because, in this pump, there is a very precise relationship between the pressure and the operating parameters, especially the current flowing through the motor of the pump. This precise relationship enables a correspondingly high accuracy of measurement.

For switching to at least one branch of the measuring arrangement which can be acted upon by fluid under pressure, a wide variety of valves could be used. Magnet valves have proven to be an advantageous means of switching.

It is moreover highly advantageous when the data supplied to the evaluating unit is in digitized form. This is achieved by the use of suitable analog-to-digital converters; this also gains the additional advantage of making the entire set of data available to other machines working on a digital basis.

DRAWING

Three embodiment examples of the device according to the invention are shown in the drawing and described more fully in the following description.

DESCRIPTION

Figure 1:
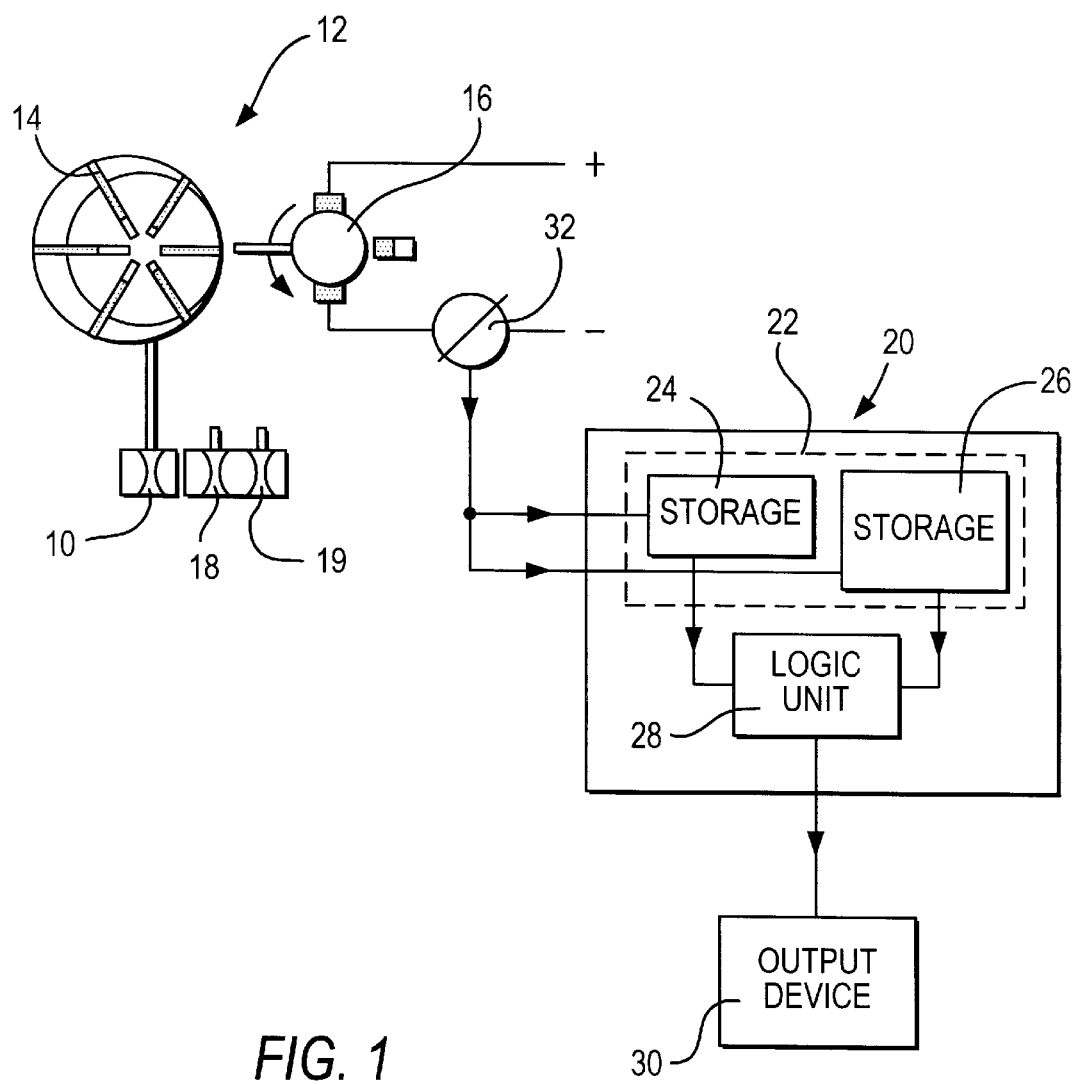
FIG. 1 shows a schematic representation of a first embodiment example showing the logical flow of the process.

The first embodiment example shown in FIG. 1 has a throttle point 10 and a pump 12 that is made up of an electric motor 16 and a compressor unit 14. Moreover, there are provided at least two reference throttles 18, 19 communicating with the pump 12 in the same place as the throttle point 10. This one connection is constructed in such a way that it is as impermeable or leakproof as possible relative to the pressure ratios. Flanged couplings, for example, are ideal, but simple hose couplings are also suitable.

Further, a measuring system 32 for acquiring the operating parameters of the pump 12 is also connected to the motor 16 of the pump 12. The measuring system 32 is connected to an evaluating unit 20 which in turn has a number of components. It contains a first storage 24 for receiving the operating parameters and a second storage 26 that receives the reference operating parameters. Further, the evaluating unit 20 contains a logical unit 28 that is connected with the first storage 24 and second storage 26. In an alternative embodiment form, both storages 24, 26 can be combined into a single storage 22. The only important point is that it must be possible to store and hold the data necessary for determining the throttle magnitude. Beyond this, the evaluating unit 20 must make it possible to adapt a reference characteristic curve stored in the storage 26 to the reference operating parameters stored in the storage 26.

Naturally, the entire evaluating operation can also be simplified, for example, by having the person operating the machine read the operating parameters and carry out any further evaluating.

Also connected to the evaluating unit 20 is an output device 30 for outputting the throttle point magnitude determined by the evaluating unit 20.

The storage 24 for receiving the reference operating parameters is constructed in such a way that the reference operating parameters can be stored as a characteristic curve or as a family of characteristic curves.

The compressor part 14 of the pump 12 is shown in FIG. 1 as a vane-cell compressor to express the fact that a vane-cell pump is particularly suitable for the process to be implemented by this device.

The claimed process can be carried out by means of the first embodiment example shown in FIG. 1 in the following way: fluid under pressure is applied to the throttle point 10 by a pump 12 and at least one operating parameter of the pump 12 is acquired and stored; in this context, pressure does not necessarily only mean overpressure but can also mean negative pressure. Acquiring and storing at least two reference operating parameters of two reference throttles 18, 19 makes it possible to compare the at least one measured operating parameter with the reference operating parameters in an evaluating unit 20 in order to determine the magnitude of the throttle point 10 and output this with the output device 30.

The use of at least two reference throttles 18, 19 instead of only one makes it possible to make a quantitative statement about the magnitude of the throttle point 10 to be measured. The first embodiment example of a device shown in FIG. 1 can be used to implement the process in such a way that the reference throttles 18, 19 and the throttle point 10 can be measured in a optional order. In particular, the reference operating parameters of a reference throttle 18 can be determined before those of the throttle point 10.

The acquired and stored reference operating parameters of the reference throttles 18, 19 can also be used for comparison with the operating parameters of a plurality of throttle points 10 to be measured.

The following quantities are representative of operating parameters of the pump 12 which are to be acquired:

The current flowing through the motor 16 driving the pump 12, the voltage applied to the motor 16 or the speed of the motor 16 and any combination of these three quantities. To determine the magnitude of a throttle point 10 as accurately as possible by using these acquired operating parameters, it is necessary to acquire them after a constant backpressure has built up at the throttle point 10. The data acquired in this manner are then transmitted to the evaluating unit 20 and stored in the storages 24, 26 reserved for them. The logic unit 28 accesses these two storages and combines the data stored in them in such a way that the magnitude of the throttle point 10 to be measured can be determined and outputted with the output device 30. The data can be combined in different ways. For example, the logic unit 28 can perform an averaging operation, it can determine the throttle point quantity using a logical comparison, or it can match a characteristic curve to the reference operating parameters and, by interpolating or extrapolating this characteristic curve, infer the magnitude of the throttle point 10.

Figure 2:
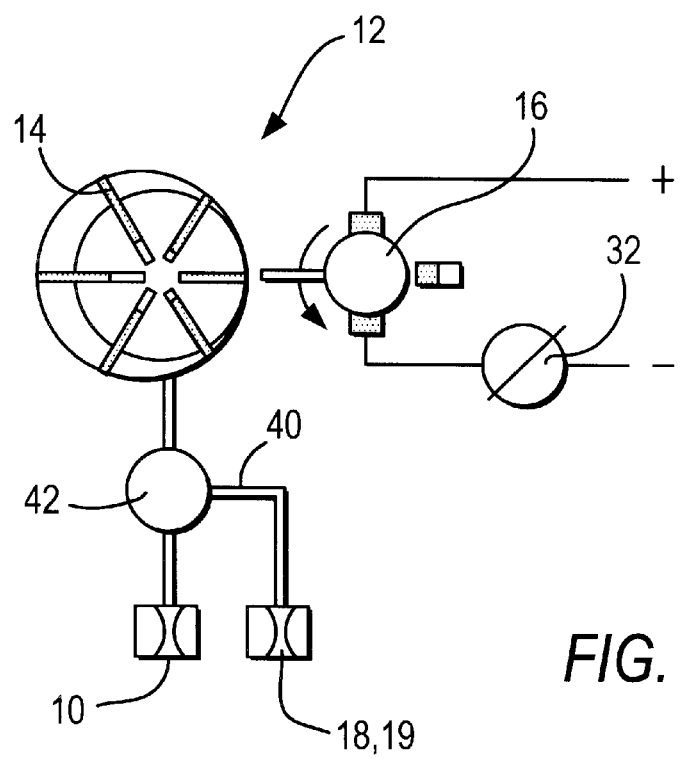
FIG. 2 shows a further embodiment example without representation of the evaluating unit and the output device; and, as part of a third embodiment example.

FIG. 2 shows a schematic view of a second embodiment example, wherein the evaluating unit 20 and the output device 30 are not shown in their entirety. Parts identical to those in the first embodiment example have the same reference numbers. The second embodiment example differs from the first embodiment example principally in that a compressor part 14, as part of the pump 12, can be connected selectively, via a magnet valve 42, with the throttle point 10 to be measured or with the reference throttles 18, 19 by way of a branch 40.

This results in a further variant of the process, since the magnet valve 42 permits switching between measuring the throttle point 10 and measuring the two reference throttles 18, 19.

The two embodiment examples of FIG. 1 and FIG. 2 can be used to carry out another variant of the process that is characterized in that already existing reference characteristic curves, i.e., reference characteristic curves that were not produced directly by the particular user of the process, can be stored in one of the storages 24 or 26 of the evaluating unit 20 and used for determining the magnitude of throttle points 10, without previous measuring of the reference throttles 18, 19.

All the variants of the process described so far permit the inclusion of correcting mechanisms that take into consideration the varying geometries of the throttle points 10 to be measured. These correcting mechanisms are also stored in one of the storages 24 or 26 and can either be correction factors and/or addition terms or a number of reference characteristic curves.

Figure 3:
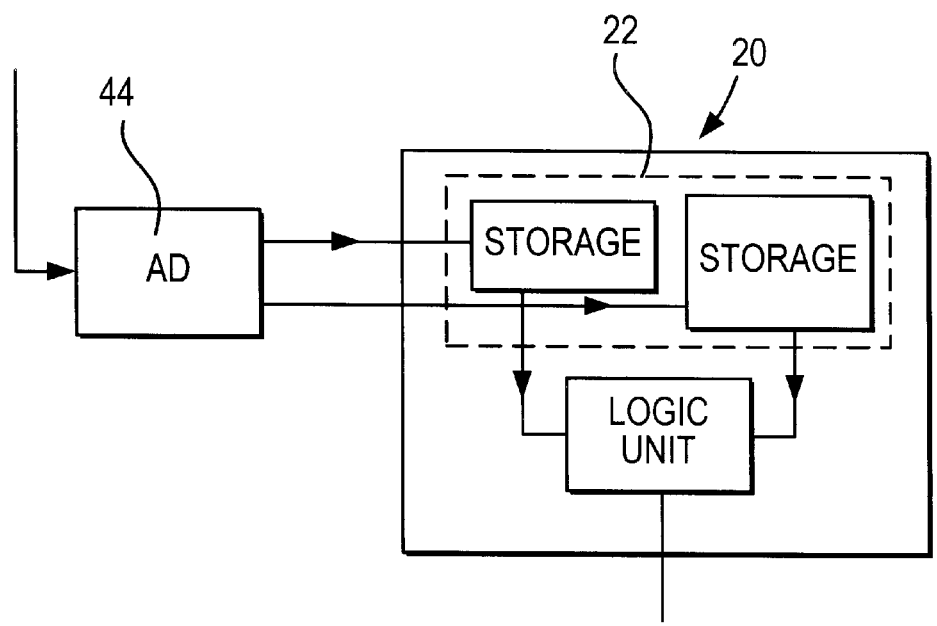
FIG. 3 shows only the evaluating unit together with an analog-to-digital converter connected as an additional element in sequence before the evaluating unit.

FIG. 3 shows an analog-to-digital converter 44 arranged as an additional element on the input side of the evaluating unit 20. This results in another variant of the process that enables the digitization of all input data.

What is claimed is:

1. Process for measuring a throttle point (10) including at least the following steps:
   Applying a fluid under pressure to the throttle point (10) by means of a pump (12), acquiring and storing at least one operating parameter of the pump (12), acquiring and storing at least two reference operating parameters of two reference throttles (18, 19), comparing the operating parameters with the reference operating parameters in an evaluating unit (20) and outputting the throttle magnitude.

2. Process according to claim 1, characterized in that at least one reference operating parameter of a reference throttle is determined prior to the throttle point to be measured.

3. Process according to one of claims 1, characterized in that the reference operating parameters of the reference throttles (18, 19) that have been acquired and stored are used for comparing the operating parameters of a plurality of throttle points (10) to be measured separately.

4. Process according to one of claims 1, characterized in that the current flowing through the motor (16) driving the pump (12) and/or the voltage applied to the motor (16) and/or the speed of a motor (16) are used as operating parameters.

5. Process according to one of claims 1, characterized in that the operating parameters are acquired at a point in time when a constant backpressure has built up.

6. Process according to claim 1, characterized in that the reference throttles (18, 19) are arranged in at least one branch (40) of the measuring arrangement, to which fluid under pressure can be applied individually, and in that determining the reference operating parameters is done by switching to this branch (40).

7. Process according to claim 1, characterized in that the reference throttles (18, 19) are measured in the same place as the throttle points (10) to be measured.

8. Process according to claim 1, characterized in that during evaluating the operating parameters and/or the reference operating parameters are/is corrected with at least one correcting factor and/or addition term which takes into account the different geometries of reference throttles (18, 19) and throttle points (10) to be measured.

9. Process according to claim 1, characterized in that a characteristic curve is matched to the reference operating parameters in the evaluating unit (20) and is used to determine the magnitude of the throttle point (10) to be measured.

10. Process for measuring a throttle point (10) including at least the following steps:
    applying a fluid under pressure to the throttle point (10) by means of a pump (12), acquiring and storing an operating parameter of the pump (12), supplying the operating parameter to an evaluating unit (20), comparing the operating parameter with at least one reference characteristic curve that is stored in the evaluating unit (20) and that represents a relationship between the operating parameter and the throttle magnitude, and outputting the throttle magnitude.

11. Process according to claim 10, characterized in that a plurality of reference characteristic curves that take into account differing geometries of throttle points (10) to be measured are stored in the storage (20).

12. Device for measuring a throttle point (10) with a pump (12), a measuring arrangement (32) for acquiring at least one operating parameter of the pump (12), an evaluating unit (20) and a reference throttle (18), characterized in that there is at least a second reference throttle (19), in that the evaluating unit (20) further has at least one storage (24) for receiving the operating parameters and a second storage (26) for receiving the reference operating parameters, as well as a logic unit (28) which calculates the throttle point magnitude and which is connected with the storages (24, 26) and an output device (30).

13. Device according to claim 12, characterized in that the reference operating parameters are stored as a characteristic curve or family of characteristic curves in the storage (24) for the reference operating parameters.

14. Device according to claim 12, characterized in that the pump (12) is driven by an electric motor (16) and, together with the compressor part (14), forms a vane-cell pump.

15. Device according to claim 12, characterized in that the measuring arrangement and/or the evaluating unit (20) have/has analog-to-digital converters (44) for the digitization of the operating parameters.

16. Device according to claim 12, wherein magnet valves are provided for switching over to at least one branch (40) of the measuring arrangement, to which can be applied fluid under pressure.

17. Device for measuring a throttle point (10) with a pump (12), a measuring arrangement (32) for acquiring at least one operating parameter of the pump (12), an evaluating unit (20) and a reference throttle (18) characterized in that there is at least a second reference throttle (19), and the reference throttles (18, 19) are arranged in at least one branch (40) to which fluid under pressure can be applied, and wherein the measuring arrangement (32) is provided with means for switching over to the at least one branch (40) for determining reference operating parameters.

* * * * *